(12) United States Patent
Camaj et al.

(10) Patent No.: US 12,240,369 B2
(45) Date of Patent: Mar. 4, 2025

(54) CUP HOLDER ASSEMBLIES AND VEHICLES INCLUDING SAME

(71) Applicant: Toyoda Gosei Co., Ltd., Kiyosu (JP)

(72) Inventors: Fran P. Camaj, Troy, MI (US); Roy C. Thorsell, Troy, MI (US); Paresh A. Rana, Troy, MI (US)

(73) Assignee: Toyoda Gosei Co., Ltd, Kiyosu (JP)

( * ) Notice: Subject to any disclaimer, the term of this patent is extended or adjusted under 35 U.S.C. 154(b) by 70 days.

(21) Appl. No.: 18/318,859

(22) Filed: May 17, 2023

(65) Prior Publication Data

US 2024/0383393 A1 Nov. 21, 2024

(51) Int. Cl.
*B60N 3/10* (2006.01)

(52) U.S. Cl.
CPC ................. *B60N 3/108* (2013.01)

(58) Field of Classification Search
CPC ........ B60N 3/108; B60N 3/105; B60N 3/106; B60N 3/107; B60N 3/11; A47G 23/0208; F16B 21/06; F16B 21/08
USPC ........................................... 248/311.2, 345.1
See application file for complete search history.

(56) References Cited

U.S. PATENT DOCUMENTS

| | | | | |
|---|---|---|---|---|
| 6,050,468 A * | 4/2000 | Kelley | ............... | B60N 3/107 224/552 |
| 7,147,192 B2 * | 12/2006 | Kong | ............... | B60N 3/108 248/311.2 |
| 7,213,793 B2 | 5/2007 | Sturt et al. | | |
| 9,068,708 B2 * | 6/2015 | Antilla | ............... | B60N 3/101 |
| 9,174,799 B2 * | 11/2015 | Virgen | ............... | B29C 45/0001 |
| 9,796,317 B2 * | 10/2017 | Neumann | ............... | B60N 3/10 |
| 10,183,604 B2 * | 1/2019 | Krishnan | ............... | B60N 3/10 |
| 10,479,252 B2 * | 11/2019 | Agresti | ............... | B60N 3/101 |
| 2011/0297717 A1 * | 12/2011 | Kaemmer | ............... | B60N 3/108 224/567 |
| 2014/0355252 A1 * | 12/2014 | Antilla | ............... | B60Q 3/20 362/101 |
| 2016/0129814 A1 | 5/2016 | Goebbels et al. | | |
| 2017/0274808 A1 * | 9/2017 | Krishnan | ............... | B60N 3/108 |
| 2019/0168654 A1 * | 6/2019 | Agresti | ............... | B60N 3/108 |
| 2024/0083325 A1 * | 3/2024 | Endlich | ............... | B60N 3/10 |

* cited by examiner

*Primary Examiner* — Ingrid M Weinhold
(74) *Attorney, Agent, or Firm* — Dinsmore & Shohl LLP (57) ABSTRACT

Disclosed herein are assemblies for cup holders which include a cup holder body defining a receptacle, and a compressible bumper including a contact portion and a tab extending from the contact portion and through a slot formed in the cup holder body to retain the contact portion of the compressible bumper within the receptacle of the cup holder body. Further disclosed herein are assemblies for a vehicle including a center console and a cup holder assembly provided within the center console, the cup holder assembly including a cup holder body defining a receptacle, and a compressible bumper including a contact portion and a tab extending from the contact portion and through a slot formed in the cup holder body to retain the contact portion of the compressible bumper within the receptacle of the cup holder body.

11 Claims, 5 Drawing Sheets

CUP HOLDER ASSEMBLIES AND VEHICLES INCLUDING SAME

TECHNICAL FIELD

The present specification generally relates to vehicle cup holder assemblies and, more specifically, vehicle cup holder assemblies with compressible bumpers configured to retain a cup being held.

BACKGROUND

Cup holders may be provided in a number of different settings, for example, in vehicles to secure cups containing liquids and/or other materials from spilling during braking, accelerating, and/or turning of the vehicle. Cup holders may receive one or more containers, for example, cups, thermos, and the like, having a variety of different shapes and sizes. If the container is too large or too small for the cup holder into which the container is inserted, the liquid may be more likely to spill out of the container during operation of the vehicle.

Accordingly, a need exists for improved cup holders that may automatically accommodate containers and cups of a variety of different shapes and sizes.

SUMMARY

In one embodiment, a cup holder assembly includes: a cup holder body having a side wall defining a receptacle, the side wall having a slot; and a compressible bumper including a contact portion and a tab extending from the contact portion and through the slot formed in the cup holder body to retain the contact portion of the compressible bumper within the receptacle of the cup holder body.

In another embodiment, a vehicle includes: a center console; and a cup holder assembly provided within the center console, the cup holder assembly including a cup holder body having a side wall defining a receptacle, the side wall having a slot; and a compressible bumper including a contact portion and a tab extending from the contact portion and through the slot formed in the cup holder body to retain the contact portion of the compressible bumper within the receptacle of the cup holder body.

In yet another embodiment, a method includes: forming a compressible bumper including a contact portion and a tab extending from the contact portion; and positioning the tab through a slot formed in a cup holder body to retain the contact portion of the compressible bumper within a receptacle defined by the cup holder body.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to vehicles having cup holder assemblies that include compressible bumpers which may deform to conform to an object, such as a container, cup, or vessel which has been disposed in the cup holder assembly.

The cup holder assembly includes a cup holder body defining one or more receptacles, and one or more compressible bumpers provided within each respectable. The one or more compressible bumpers may be constructed of a deformable material such that when a cup is inserted into the one or more receptacles the one or more compressible bumpers may conform to the shape and size of the cup to securely hold the cup in the receptacle of the cup holder body. Various embodiments of the cup holder assembly are described in more detail herein. Whenever possible, the same reference numerals will be used throughout the drawings to refer to the same or like parts.

As used herein, the singular forms "a," "an" and "the" include plural referents unless the context clearly dictates otherwise. Thus, for example, reference to "a" component includes aspects having two or more such components, unless the context clearly indicates otherwise.

Figure 1:
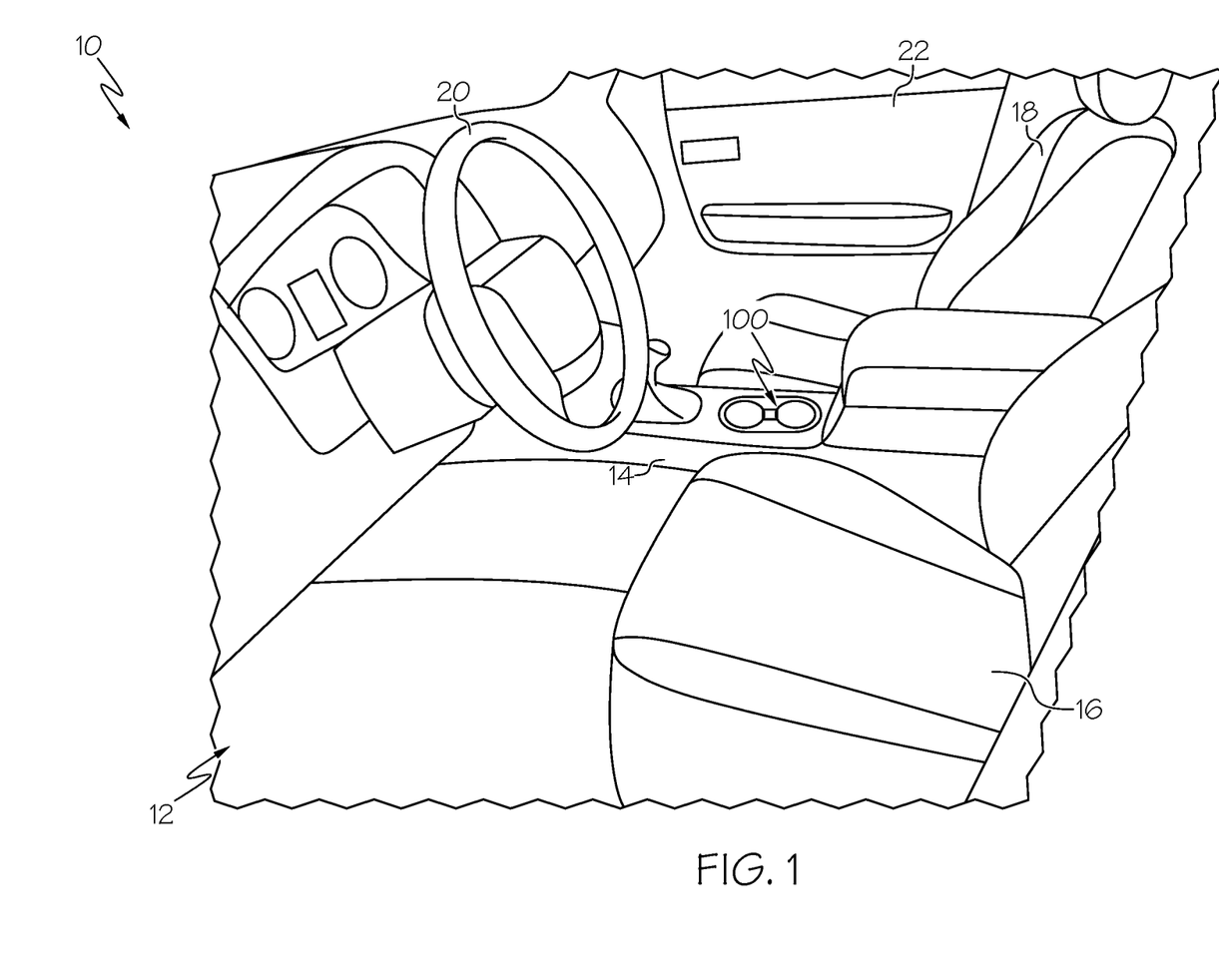
FIG. 1 schematically depicts a perspective view of an interior of a vehicle including a cup holder assembly, according to one or more embodiments shown and described herein.

Referring now to FIG. 1, a vehicle 10 having an interior 12 is illustrated according to one or more embodiments described herein. The interior 12 may generally include a center console 14 and a cup holder assembly 100 disposed in the center console 14. As described in more detail herein, the cup holder assembly 100 may securely hold one or more cups such that the cup does not spill any liquid or other substance held inside the cup when the vehicle 10 brakes, accelerates, and/or turns.

As shown, the center console 14 is provided between a driver's seat 16 and a front passenger seat 18. The driver's seat 16 is located behind a steering wheel 20. However, it should be appreciated that the cup holder assembly 100 may be located at any other suitable location of the vehicle 10 and not limited to being located within the center console 14. For example, the cup holder assembly 100 may be located within a separate center console between a pair of rear passenger seats (not shown). In other embodiments, the cup holder assembly 100 may be located on one or more side doors of the vehicle 10 such as, for example, a front passenger door 22 of the vehicle 10. Accordingly, the location of the cup holder assembly 100 is not limited to that described herein and other locations are contemplated as being within the scope of the present disclosure.

Additionally, it should be appreciated that the cup holder assembly 100 may be located in any other environment separate from the vehicle 10 depicted in FIG. 1. For example, the cup holder assembly 100 may be incorporated into any suitable environment where cup holders may be used such as, for example, within an armrest of a chair or couch, bicycle, train, airplane, table, and the like. In other embodiments, the cup holder assembly 100 may be a stand-alone device such that the cup holder assembly 100 may be portable and readily integrated into some separate structure, for example, a chair, couch, train, airplane, bicycle, or the like.

Figure 2:
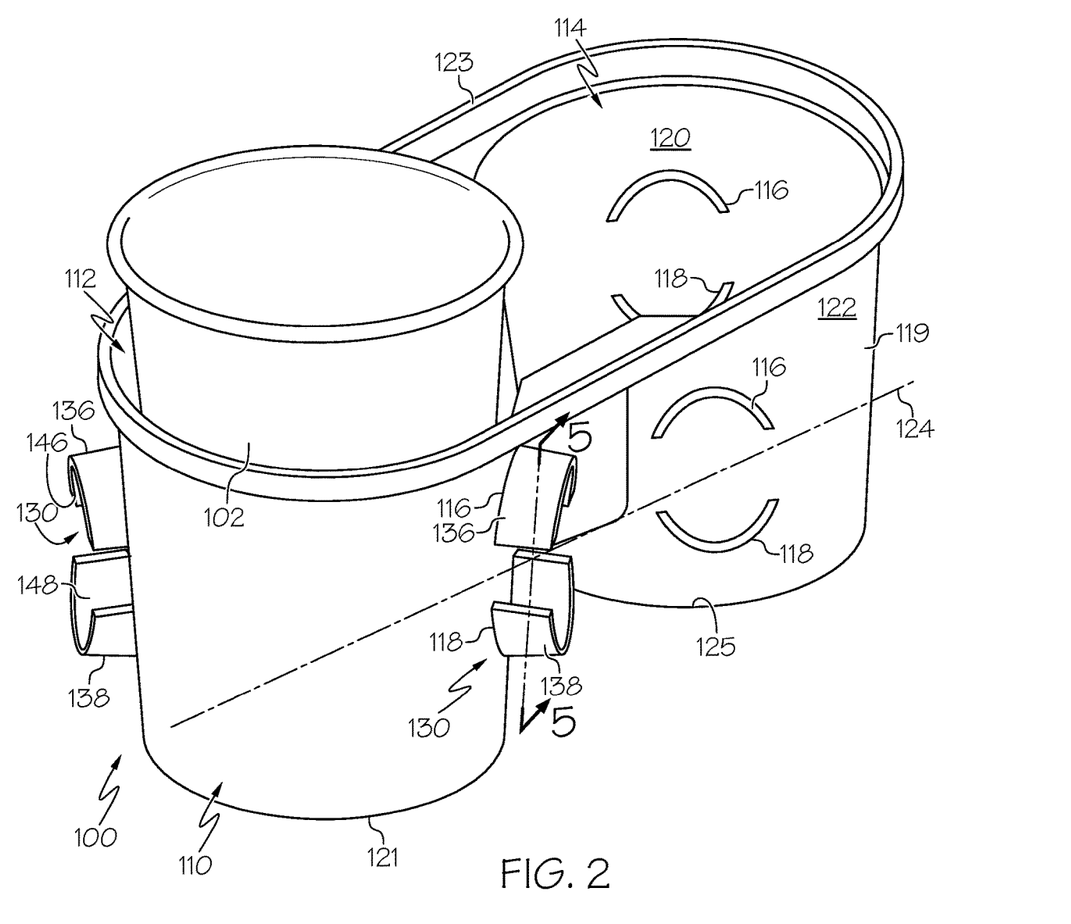
FIG. 2 schematically depicts a perspective view of the cup holder assembly of FIG. 1, according to one or more embodiments shown and described herein.

Referring now to FIG. 2, the cup holder assembly 100 is shown in isolation. The cup holder assembly 100 generally includes a cup holder body 110, which defines a cavity including a first receptacle 112 and a second receptacle 114 each of which are shaped and sized to allow an object such as a cup 102 to be securely received within the cup holder assembly 100. As referred to herein, the first receptacle 112 and the second receptacle 114 may be collectively referred to as receptacles 112. 114. The cup holder body 110 may be constructed of any suitable material, including but not limited to plastic.

The cup holder body 110 includes at least one side wall 119 and a bottom wall 121. The side wall 119 includes an inner surface 120, an outer surface 122 opposite the inner surface 120, a top edge 123, and a bottom edge 125 opposite the top edge 123. The bottom wall 121 extends across the bottom edge 125 of the side wall 119. The top edge 123 defines an opening through which the cup 102 may be received within either of the receptacles 112, 114. The side wall 119, specifically, the inner surface 120, and the bottom wall 121 define the receptacles 112, 114.

In the embodiment illustrated in FIG. 2, the first receptacle 112 and the second receptacle 114 are shown. The first receptacle 112 and the second receptacle 114 are shown as having a generally cylindrical shape with connected generally circular openings, and which may taper from the top edge 123 towards the bottom edge 125. However, it should be understood that the openings of the first receptacle 112 and the second receptacle 114 may be any suitable shape, including but not limited to a rectangle, a hexagon, an oval, or any other suitable shape. While two receptacles 112, 114 are illustrated in FIG. 2, it should be understood that the cup holder assembly 100 may include any number of receptacles 112, 114, including but not limited to one receptacle, three receptacles, four receptacles, or more than four receptacles. Additionally, although depicted and referred to herein as a "cup" 102, it should be appreciated that the cup 102 may be any suitable object or vessel which is received inside the cup holder assembly 100, including but not limited to a cup, a glass, a tumbler, a mug, or any other suitable vessel.

Referring still to FIG. 2, an upper slot 116 and a lower slot 118 are formed in the side wall 119 of each receptacle 112, 114 of the cup holder body 110 and extend through the inner surface 120 and the outer surface 122 of the side wall 119. As referred to herein, the upper slot 116 and the lower slot 118 may be collectively referred to as the slots 116, 118.

It should be understood that each receptacle 112. 114 may contain any number of slots 116, 118. For example, each receptacle 112, 114 may contain a first pair of slots 116, 118 formed within a first location or side of the receptacle 112, 114 for receiving a first compressible bumper 130, and a second pair of slots 116, 118 within second location or side of the receptacles 112, 114, spaced apart from the first pair of slots 116, 118, to receive a second compressible bumper 130. In some embodiments, a first pair of slots 116, 118 and a second pair of slots 116, 118 may be formed in the first receptacle 112 of the cup holder body 110, as discussed herein, while only a first pair of slots 116, 118 are formed in the second receptacle 114, or vice versa. As such, it is not necessary for the first receptacle 112 and the second receptacle 114 to have the same number of slots 116, 118.

As shown in FIG. 2, the slots 116, 118 are formed at a substantially medial location between the top edge 123 and the bottom edge 125 of the side wall 119. However, it should be appreciated that the slots 116, 118 may be arranged in any location on the cup holder body 110, such as adjacent to or proximate the top edge 123 of the cup holder body 110, adjacent to or proximate the bottom edge 125 of the side wall 119, or any other suitable location on the cup holder body 110.

Referring still to FIG. 2, the slots 116, 118 are shown to have an arcuate or curved shape relative to a horizontal plane extending in a cup holder longitudinal direction 124. The horizontal plane is parallel to a plane of the bottom wall 121 of the cup holder body 110. However it is to be understood that the slots 116, 118 may be any suitable shape, including but not limited to linear or angled. In embodiments, the upper slot 116 and the lower slot 118 are mirror images of one another relative to the horizontal plane of the cup holder body 110. In other embodiments, the upper slot 116 may have a different geometry than the lower slot 118. For example, the upper slot 116 may be curved, as shown, while the lower slot 118 is linear, or vice versa.

A plurality of compressible bumpers 130 are coupled to the side wall 119 of the cup holder body 110 by at least partially extending through the upper slot 116 and the lower slot 118. It should be appreciated that any number of compressible bumpers 130 may be removably attached to the cup holder body 110, including but not limited to one compressible bumper 130, two compressible bumpers 130, four compressible bumpers 130, ten compressible bumpers 130, or any suitable number of compressible bumpers 130. Further, when multiple compressible bumpers 130 are inserted into the cup holder body 110, the cup holder assembly 100 may be able to accommodate an even larger range of size of cups 102 compared to a cup holder assembly 100 with a single compressible bumper 130. In other words, when the cup holder assembly 100 includes a single compressible bumper 130, the range of cup sizes the cup holder assembly 100 may accommodate is equal to the amount of compression of the single compressible bumper 130. When the cup holder assembly 100 includes a plurality of compressible bumpers 130, the range of cups the cup holder assembly 100 can accommodate is equal to the combined amount of compression of the multiple compressible bumpers 130. Each compressible bumper 130 has an upper tab 136 and a lower tab 138 extending therefrom as will be described in more detail below.

Figure 3:
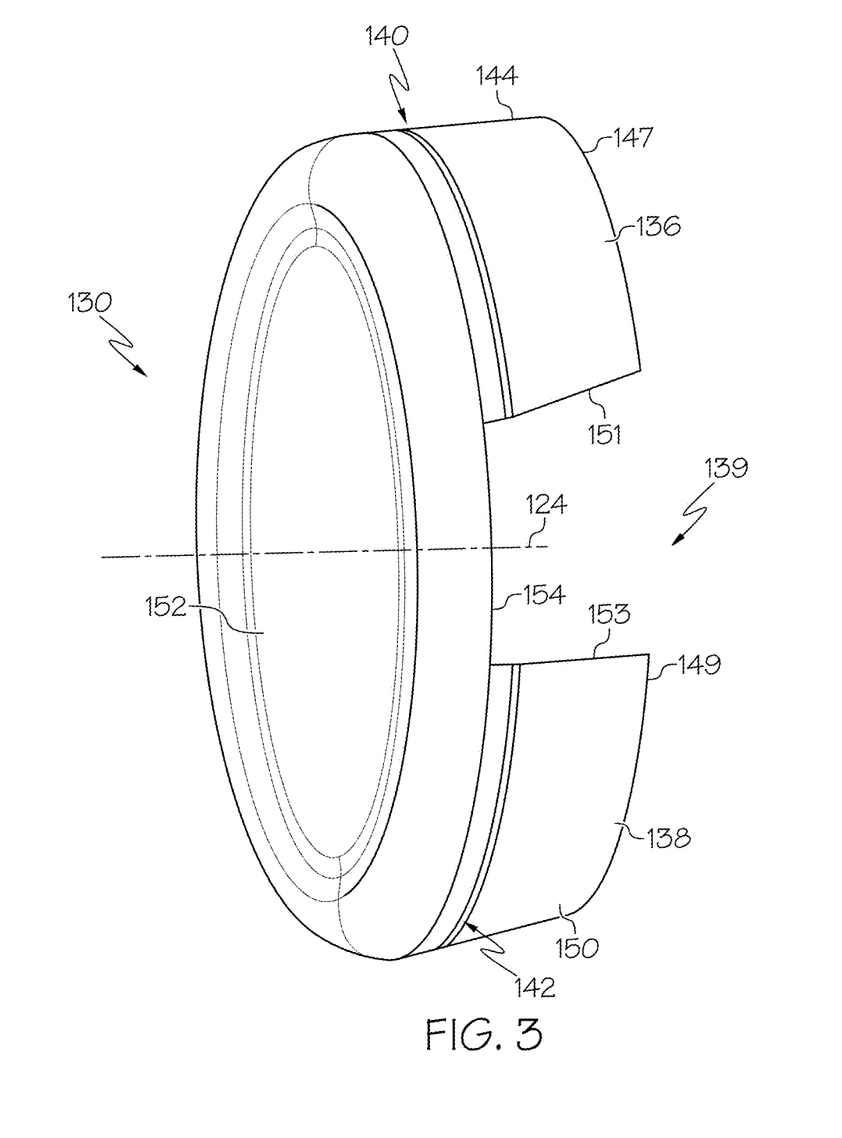
FIG. 3 schematically depicts a perspective view of a compressible bumper of the cup holder assembly of FIG. 1, according to one or more embodiments shown and described herein.

Referring now to FIG. 3, the compressible bumper 130 is illustrated separate from the cup holder body 110. The compressible bumper 130 includes a contact portion 152 having an inner surface 154. When coupled to the cup holder body 110 (FIG. 2), the contact portion 152 faces toward a center of the receptacles 112, 114 so as to contact and retain the cup 102 disposed in the cup holder body 110 by a compressive force of the contact portion 152 creating a frictional engagement. Additionally, when the compressible bumper 130 is inserted into the cup holder body 110 (FIG. 1), the inner surface 154 contacts the inner surface 120 of the cup holder body 110. As illustrated in FIG. 3, the compressible bumper 130 has a generally oval shape when viewed from the front. However, it should be understood that the compressible bumper 130 may have any shape, including but not limited to circular, rectangular, or any other suitable shape.

Referring to FIGS. 2 and 3, the compressible bumper 130 includes the upper tab 136 and the lower tab 138 extending from the inner surface 154 of the contact portion 152 of the compressible bumper 130. As illustrated in FIG. 3, the compressible bumper 130 includes an upper tab 136 and a lower tab 138 extending from the contact portion 152. The upper tab 136 has a top surface 144 a bottom surface 146, a rear edge 147, and a side edge 151. The lower tab 138 has a top surface 148, a bottom surface 150, a rear edge 149, and a side edge 153. As referred to herein, the upper tab 136 and the lower tab 138 may be collected referred to as the tabs 136, 138. The upper tab 136 and the lower tab 138 are spaced apart from one another such that a gap 139 is defined between the side edge 151 of the upper tab 136 and the side edge 153 of the lower tab 138.

The gap 139 formed between the side edge 151 of the upper tab 136 and the side edge 153 of the lower tab 138 may allow for the compressible bumper 130 to flex during installation into the upper slot 116 and the lower slot 118, respectively, as illustrated in FIG. 2. However, in embodiments, it should be understood that the compressible bumper 130 may include a single tab, such as the upper tab 136 or the lower tab 138, protruding from the inner surface 154 of the contact portion 152. However, in this embodiment, it should be appreciated that the slots 116, 118 would be modified to correspond to the shape of the single tab 136, 138, such that only a single slot is provided. However, it should be appreciated that, in embodiments, the cup holder body 110 may include a single slot when the single tab 136, 138, or additional tabs are provided.

The tabs 136, 138 may be any suitable size or shape protruding from the contact portion 152. As a non-limiting example, the tabs 136, 138 may have a triangular shape or trapezoidal shape protruding from the contact portion 152. The number of tabs 136, 138 of the compressible bumper 130 may be less than the number of slots in the cup holder body 110 as described in FIG. 2. As a non-limiting example, the compressible bumper 130 may have one tab 136, 138 and the cup holder body 110 may have two slots 116, 118. However, it should be appreciated that the compressible bumper 130 does not have more tabs 136, 138 than the number of slots 116, 118.

The upper tab 136 has a tapered shape from the portion of the upper tab 136 extending from the contact portion 152 to the rear edge 147 of the upper tab 136, such that the portion of the upper tab 136 closest to the contact portion 152 has a larger cross-sectional dimension than the portion of the upper tab 136 closest to the rear edge 147. Stated another way, a distance between the bottom surface 146 and the top surface 144 of the upper tab 136 decreases in a direction from the contact portion 152 to the rear edge 147 of the upper tab 136. Similarly, the lower tab 138 has a tapered shape from the portion of the lower tab 138 extending from the contact portion 152 to the rear edge 149 of the lower tab 138, such that the portion of the lower tab 138 closest to the contact portion 152 has a larger cross-sectional dimension than the portion of the lower tab 138 closest to the rear edge 147. Stated another way, a distance between the bottom surface 150 and the top surface 148 of the lower tab 138 decreases in a direction from the contact portion 152 to the rear edge 149 of the lower tab 138.

In the embodiment illustrated in FIG. 3, the tabs 136, 138 are shown with a arcuate (curved) shape relative to the horizontal plane. However it is to be understood that the tabs 136, 138 may have any suitable shape, including but not limited to linear or angled. The upper tab 136 and the lower tab 138 may be mirror images of one another relative to the horizontal plane of the cup holder body 110. In other embodiments, the upper tab 136 and the lower tab 138 have different shapes, profiles, and/or sizes compared to one another, such as the upper tab 136 having a curved profile and the lower tab 138 having a flat profile. However, as discussed in more detail herein, the geometry of the upper tab 136 corresponds to the geometry of the upper slot 116 (FIG. 2), and the geometry of the lower tab 138 corresponds to the geometry of the lower slot 118 (FIG. 2).

In embodiments, the compressible bumper 130 is formed from a one-piece, monolithic structure. In other embodiments, the compressible bumper 130 is formed from a plurality of individual components and joined together. For example, the contact portion 152 may be formed separate from the upper tab 136 and the lower tab 138. The upper tab 136 and lower tab 138 are secured to the contact portion 152 in any suitable manner such as, for example, adhesive, mechanical fastener, and the like. More particularly, the contact portion 152 of the compressible bumper 130 may be formed from a deformable or elastomeric material so as to conform to the cup 102 that may be inserted into the cup holder body 110. As a non-limiting example, the compressible bumper 130 may be made of rubber.

The compressible bumper 130 may comprise any suitable stiffness such that the contact portion 152 of the compressible bumper 130 may be compressed by the force of a cup 102 being inserted into a receptacle 112, 114 of the cup holder body 110 and securely hold the cup 102. After the cup 102 has been inserted into a receptacle 112, 114 of the cup holder body 110 the contact portion 152 of the compressible bumper 130 may deform to grip the cup 102 such that the cup 102 is securely held in the receptacle 112, 114 of the cup holder body 110. By deforming different amounts, the compressible bumpers 130 may accommodate various sizes and shapes of cups 102. That is, the compressible bumper 130 may compress a further amount when a larger cup 102 is inserted into the cup holder body 110 compared to the amount of compression of the compressible bumper 130 when a smaller cup 102 is inserted into the cup holder body 110. Accordingly, the compressible bumper 130 may hold the cup more securely during high load situations, such as aggressive braking, accelerating, and/or turning of a vehicle when compared to a cup holder assembly without the compressible bumpers 130.

Figure 4:
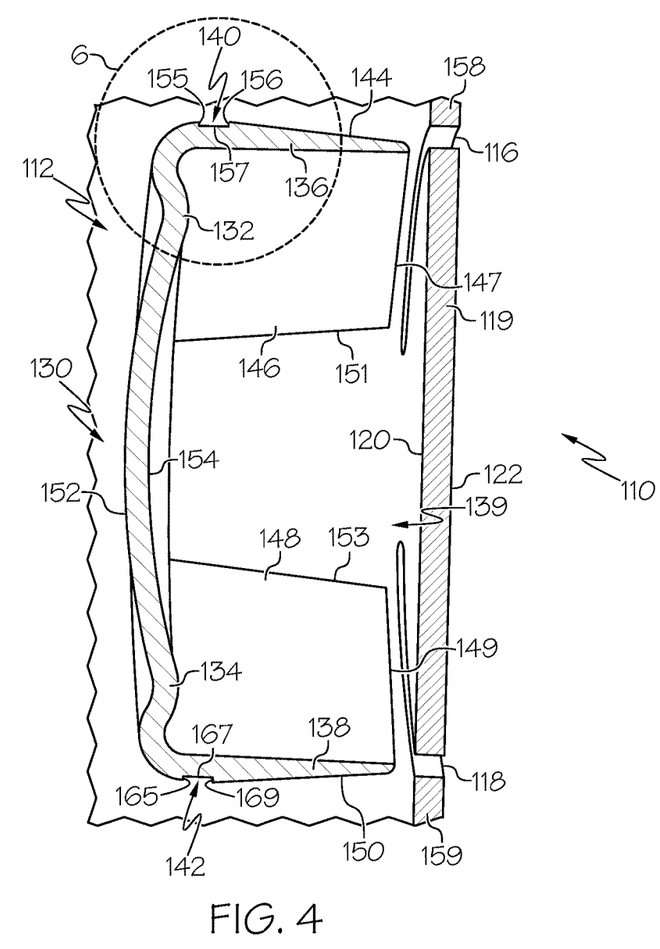
FIG. 4 schematically depicts a partial cross-section view of the cup holder assembly of FIG. 1 taken along line 5-5 of FIG. 2 prior to installation of the compressible bumper of FIG. 3, according to one or more embodiments shown and described herein.

Referring now to FIG. 4, a cross-sectional view of the compressible bumper 130 and the cup holder body 110 prior to installation of the compressible bumper 130 is illustrated. In embodiments, the central portion of contact portion 152 between the upper projection 132 and the lower projection 134 is convex relative to the cup holder body 110. The convex shape of the central portion of the contact portion 152 allows the contact portion 152 to deform as a cup 102 is inserted into the cup holder body 110. Further, the contact portion 152 forms a taper between the upper projection 132 and the center of the contact portion 152, which allows the cup 102 to be more easily inserted into the cup holder body. In some embodiments, the upper projection 132 and the lower projection 134 are continuous to bound a perimeter of the convex central portion of the contact portion 152. However it should be understood that the contact portion 152 may have any other suitable shape.

As shown in FIG. 4, a thickness of the upper tab 136 and the lower tab 138, and specifically the bottom surface 146 of the upper tab 136 and the lower tab 138, may be tapered in a direction opposite the contact portion 152. The portion of the upper tab 136 nearest the rear edge 147 has a smaller cross-sectional dimension than the portion of the upper tab 136 nearest the contact portion 152. The portion of the lower tab 138 nearest the rear edge 149 has a smaller cross-sectional dimension than the portion of the lower tab 138 nearest the contact portion 152. The upper tab 136 is inserted through the upper slot 116 such that the rear edge 147 passes through the upper slot 116 first. The lower tab 138 is inserted through the lower slot 118 such that the rear edge 149 passes through the lower slot 118 first. As described in more detail herein, the tapered shape of the upper tab 136 and the lower tab 138 allows the upper tab 136 and the lower tab 138 to more easily be inserted through the upper slot 116 and the lower slot 118, respectively, compared to an upper tab 136 and a lower tab 138 which have a constant cross-sectional shape.

Additionally, an upper engagement portion 140 is formed in the top surface 144 of the upper tab 136. The upper engagement portion 140 may be a cutout formed in the upper tab 136. The upper engagement portion 140 includes a front wall 155, a rear wall 156 opposite the front wall 155, and a base wall 157 traversing between the front wall 155 and the rear wall 156. While the upper engagement portion 140 is illustrated as being a generally rectangular shape, it is to be understood that the upper engagement portion 140 may be any suitable shape, including but not limited to a semi-circular shape, a triangular shape, or any other suitable shape.

The lower tab 138 includes a lower engagement portion 142 formed in the bottom surface 150. The lower engagement portion 142 is shaped and sized in a similar manner to the upper engagement portion 140. The lower engagement portion 142 includes a front wall 165, a rear wall 169 opposite the front wall 165, and a base wall 167 traversing between the front wall 165 and the rear wall 169. In embodiments, the upper engagement portion 140 and the lower engagement portion 142 may be mirror images of one another. In other embodiments, the upper engagement portion 140 and the lower engagement portion 142 may have different shapes.

Referring still to FIG. 4, the compressible bumper 130 includes an upper projection 132 provided proximate the upper tab 136, and a lower projection 134 provided proximate the lower tab 138. The upper projection 132 and the lower projection 134 may be formed in the contact portion 152 and generally have a concave shape relative to the convex shape of the central portion of the contact portion 152. The concave shape of the upper projection 132 and the lower projection 134 allow for the upper projection 132 and the lower projection 134 to deform as the upper projection 132 and the lower projection 134 is compressed against the inner surface 120 of the cup holder body 110. However, it should be appreciated that the upper projection 132 and the lower projection 134 may have any suitable shape. The lower projection 134 may be shaped and sized similar to the upper projection 132. Accordingly, the upper projection 132 and the lower projection 134 may be mirror images of one another. In other embodiments, the upper projection 132 and the lower projection 134 may have different shapes. Additionally, in embodiments, the upper projection 132 and the lower projection 134 are equidistantly spaced apart from the upper tab 136 and the lower tab 138, respectively.

Figure 5:
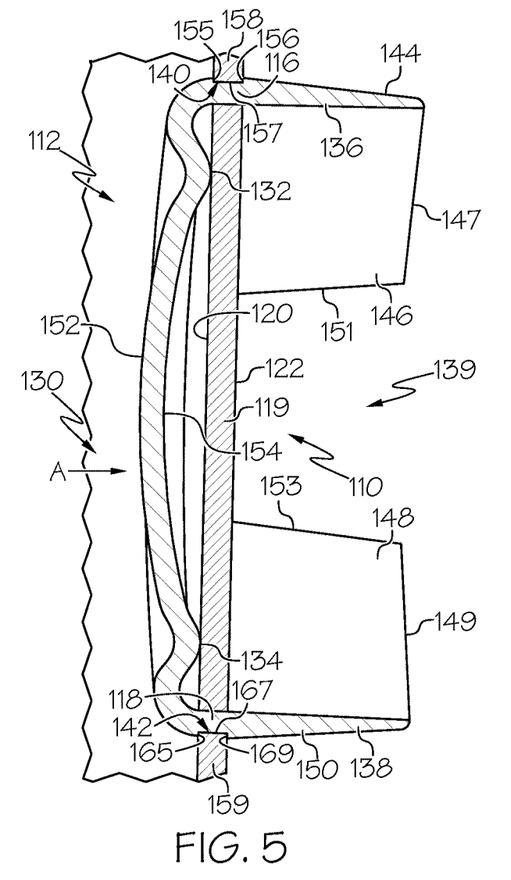
FIG. 5 schematically depicts a partial cross-section view of the cup holder assembly of FIG. 1 taken along line 5-5 of FIG. 2 after installation of the compressible bumper of FIG. 3, according to one or more embodiments shown and described herein.

Referring now to FIG. 5, a section view of the compressible bumper 130 and the cup holder body 110 after installation of the compressible bumper 130 into the cup holder body 110 is illustrated. The compressible bumper 130 may be inserted into the cup holder body 110 by moving the compressible bumper 130 in a direction of arrow A such that the upper tab 136 is inserted into the upper slot 116 and the lower tab 138 is inserted into the lower slot 118. The upper tab 136 and the lower tab 138 may be inserted into the upper slot 116 and the lower slot 118 simultaneously. In other embodiments, the upper tab 136 may be inserted into the upper slot 116 prior to the lower tab 138 being inserted into the lower slot 118, or vice-versa. Accordingly, as discussed herein, the upper tab 136 has a geometry corresponding to the geometry of the upper slot 116, and the lower tab 138 has a geometry corresponding to the geometry of the lower slot 118 such that the upper tab 136 and the lower tab 138 may be received within the upper slot 116 and the lower slot 118, respectively. As the upper tab 136 and the lower tab 138 are inserted through the upper slot 116 and the lower slot 118, respectively, the upper tab 136 and the lower tab 138 may compress to fit through the upper and lower surfaces of the upper slot 116 and the lower slot 118, respectively.

With respect to the upper engagement portion 140, the front wall 155 is oriented to face and contact the inner surface 120 of the cup holder body 110. The rear wall 156 of the upper engagement portion 140 is oriented to face and contact the outer surface 122. The base wall 157 of the upper engagement portion 140 is oriented to face and contact an upper surface 158 of the upper slot 116. Additionally, the lower engagement portion 142 may engage the side wall 119 in a similar manner to the upper engagement portion 140. Specifically, the lower engagement portion 142 engages a lower surface 159 of the lower slot 118.

By the upper engagement portion 140 contacting the upper surface 158 of the upper slot 116 and the lower engagement portion 142 contacting the lower surface 159 of the lower slot 118, the compressible bumper 130 may be further secured to the cup holder body 110. As shown, the upper projection 132 and the lower projection 134 contact the inner surface 120 of the cup holder body 110. The upper projection 132 and the lower projection 134 prevent excessive compression of the contact portion 152. In other words, the upper projection 132 and the lower projection 134 limit the amount of compression of the contact portion 152 in a direction toward the inner surface 120 of the cup holder body 110.

Figure 6:
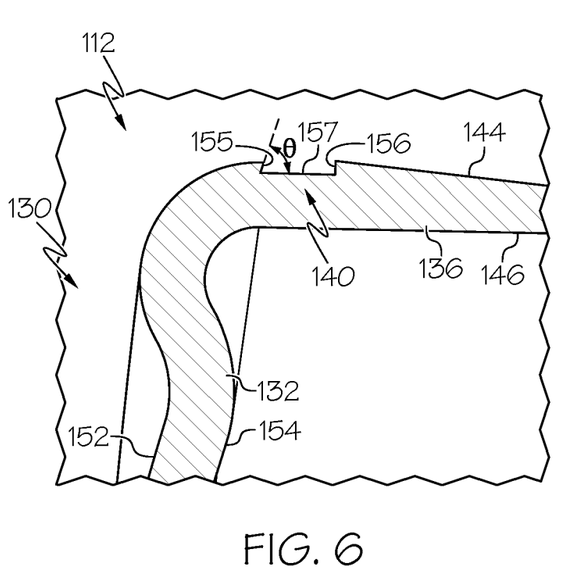
FIG. 6 schematically depicts an enlarged partial cross-section view of the compressible bumper taken from circle 6 of FIG. 4, according to one or more embodiments shown and described herein.

Referring now to FIG. 6, an enlarged cross-sectional view of the upper engagement portion 140 of the upper tab 136 is illustrated. In embodiments, the front wall 155 of the upper engagement portion 140 may be oriented at an acute angle θ relative to the base wall 157 of the upper engagement portion 140. In embodiments, the angle θ is about 80 degrees. In embodiments, the angle θ may be greater than or equal to 45 degrees and less than or equal to 85 degrees. In embodiments, the angle θ may be greater than or equal to 60 degrees and less than or equal to 85 degrees. In embodiments, the angle θ may be greater than or equal to 70 degrees and less than or equal to 80 degrees. Although, the front wall 155 is shown oriented at an acute angle relative to the base wall 157, it should be appreciated that, in embodiments, the front wall 155 may be oriented at a right angle relative to the base wall 157. However, in embodiments in which the front wall 155 is oriented at an acute angle relative to the base wall 157, the upper engagement portion 140 may provide an increased grip on the upper surface 158 (FIG. 4) as compared to embodiments in which the front wall 155 is at a right angle relative to the base wall 157. In embodiments, it should be appreciated that the rear wall 156 of the upper engagement portion 140 may also be oriented at an acute angle relative to the base wall 157, similar to the front wall 155 of the upper engagement portion 140. It should be appreciated that by orienting each of the front wall 155 and the rear wall 156, the grip of the upper engagement portion 140 on the inner surface 120 and the outer surface 122 may be increased. In embodiments, the lower engagement portion 142 (FIG. 4) may be similarly shaped to provide a similar acute angle between one or more opposite faces to increase the grip of the lower engagement portion 142 on the inner surface 120 and the outer surface 122. In doing so, the compressible bumper 130 may be more securely engaged with the cup holder body 110.

In situations in which the compressible bumper 130 needs to be removed such as, for example, to replace the compressible bumper 130 with a new compressible bumper 130, one or both of the upper tab 136 and the lower tab 138 may be compressed at a location exterior of the cup holder body 110 proximate the upper surface 158 and the lower surface 159, respectively, and the compressible bumper 130 is moved in a direction opposite the direction of arrow A. For example, the upper tab 136 and the lower tab 138 may be compressed to reduce a thickness thereof such that the upper tab 136 and the lower tab 138 may fit through the upper engagement portion 140 and the lower engagement portion, respectively. Thereafter, the compressible bumper 130, or a replacement compressible bumper 130 may be reinserted into the cup holder body 110 in the manner discussed herein.

From the above, it is to be appreciated that defined herein is an improved cup holder that may securely hold a variety of different shapes and sizes of vessels which may be inserted into the cup holder. Specifically, the cup holders include one or more compressible bumpers that are removably attached to a cup holder body of the holder. The compressible bumpers include a contact portion and a tab extending from the contact portion and through a slot formed in the cup holder body to retain the contact portion of the compressible bumper within a receptacle of the cup holder body.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cup holder assembly comprising:
a cup holder body having a side wall defining a receptacle, the side wall having an upper slot and a lower slot; and
a compressible bumper including a contact portion, an upper tab extending from the contact portion and through the upper slot formed in the cup holder body, and a lower tab opposite the upper tab extending from the contact portion and through the lower slot formed in the cup holder body to retain the contact portion of the compressible bumper within the receptacle of the cup holder body,
wherein the upper tab and the lower tab are arcuate and mirror images of one another about a horizontal plane,
wherein the upper slot and the lower slot are arcuate and mirror images of one another about the horizontal plane.

2. The cup holder assembly of claim 1, wherein:
the upper tab includes an upper engagement portion formed in the upper tab, an upper surface of the cup holder body defining the upper slot is received within the upper engagement portion to retain the upper tab relative to the cup holder body; and
the lower tab includes a lower engagement portion formed in the lower tab, a lower surface of the cup holder body defining the lower slot is received within the lower engagement portion to retain the lower tab relative to the cup holder body.

3. The cup holder assembly of claim 1, wherein a center portion of the contact portion is convex.

4. The cup holder assembly of claim 3, wherein the contact portion includes a projection spaced apart from the tab and contacting an inner surface of the cup holder body.

5. The cup holder assembly of claim 1, wherein:
the contact portion includes an upper projection spaced apart from the upper tab and contacting an inner surface of the cup holder body; and
the contact portion includes a lower projection spaced apart from the lower tab and contacting the inner surface of the cup holder body.

6. The cup holder assembly of claim 1, wherein the cup holder body defines a pair of receptacles and further comprises a pair of the compressible bumper provided within each receptacle of the pair of receptacles.

7. A method comprising:
forming a compressible bumper including a contact portion, an upper tab extending from the contact portion, and a lower tab opposite the upper tab extending from the contact portion; and
positioning the upper tab through an upper slot formed in a cup holder body and the lower tab through a lower slot formed in the cup holder body to retain the contact portion of the compressible bumper within a receptacle defined by the cup holder body,
wherein the contact portion includes an upper projection extending toward and contacting an inner surface of the cup holder body;
wherein the contact portion includes a lower projection extending toward and contacting the inner surface of the cup holder body.

8. The method of claim 7, wherein:
the upper tab and the lower tab are arcuate and mirror images of one another about a horizontal plane; and
the upper slot and the lower slot are arcuate and mirror images of one another about the horizontal plane.

9. The method of claim 8, further comprising:
positioning an upper surface of the cup holder body defining the upper slot within an upper engagement portion formed in the upper tab; and
positioning a lower surface of the cup holder body defining the lower slot within a lower engagement portion formed in the lower tab.

10. A cup holder assembly comprising:
a cup holder body having a side wall defining a receptacle, the side wall having an upper slot and a lower slot; and a compressible bumper including a contact portion, an upper tab extending from the contact portion and through the upper slot formed in the cup holder body, and a lower tab opposite the upper tab extending from the contact portion and through the lower slot formed in the cup holder body to retain the contact portion of the compressible bumper within the receptacle of the cup holder body, wherein the contact portion includes an upper projection extending toward and contacting an inner surface of the cup holder body;

wherein the contact portion includes a lower projection extending toward and contacting the inner surface of the cup holder body.

11. The cup holder assembly of claim 10, wherein a surface of each of the upper projection and the lower projection opposite the inner surface of the cup holder body has a concave shape.

\* \* \* \* \*

UNITED STATES PATENT AND TRADEMARK OFFICE
CERTIFICATE OF CORRECTION

| | | |
|---|---|---|
| PATENT NO. | : 12,240,369 B2 | Page 1 of 1 |
| APPLICATION NO. | : 18/318859 | |
| DATED | : March 4, 2025 | |
| INVENTOR(S) | : Fran P. Camaj, Roy C. Thorsell and Paresh A. Rana | |

It is certified that error appears in the above-identified patent and that said Letters Patent is hereby corrected as shown below:

On the Title Page

Item (71), applicant, city, delete "Kiyosu" and insert --Kiyosu-shi, Aichi-ken--, therefor.

Item (73), assignee, city, delete "Kiyosu" and insert --Kiyosu-shi, Aichi-ken--, therefor.

In the Specification

In Column 3, Line(s) 24, delete "112." and insert --112,--, therefor.

In Column 3, Line(s) 62, delete "112." and insert --112,--, therefor.

In Column 6, Line(s) 2, before "arcuate", delete "a" and insert --an--, therefor.

Signed and Sealed this
Seventh Day of October, 2025

John A. Squires
*Director of the United States Patent and Trademark Office*